United States Patent [19]

Robert et al.

[11] Patent Number: 5,057,921
[45] Date of Patent: Oct. 15, 1991

[54] PROCESS AND DEVICE FOR TEMPORAL IMAGE INTERPOLATION, WITH CORRECTED MOVEMENT COMPENSATION

[75] Inventors: Philippe Robert; Pascal Basset, both of Rennes, France

[73] Assignee: Thomson Consumer Electronics, Courbevoie, France

[21] Appl. No.: 496,930

[22] Filed: Mar. 21, 1990

[30] Foreign Application Priority Data

Mar. 31, 1989 [FR] France ................. 89 04256

[51] Int. Cl.$^5$ .............................................. H04N 7/01
[52] U.S. Cl. .................................... 358/140; 358/136; 358/105
[58] Field of Search ....................... 358/136, 105, 140; 382/41, 44

[56] References Cited

U.S. PATENT DOCUMENTS

| | | | |
|---|---|---|---|
| 4,383,272 | 4/1983 | Netravali et al. | 358/136 |
| 4,663,665 | 5/1987 | Tanaka et al. | 358/140 |
| 4,668,986 | 5/1987 | Furukawa | 358/136 |
| 4,679,086 | 7/1987 | May | 358/167 |
| 4,692,801 | 9/1987 | Ninomiya et al. | 358/133 |
| 4,747,152 | 5/1988 | Knutsson et al. | 382/21 |
| 4,864,394 | 9/1989 | Gillard | 358/105 |
| 4,924,305 | 5/1990 | Nakazawa et al. | 358/105 |
| 4,987,489 | 1/1991 | Hurley et al. | 358/105 |

FOREIGN PATENT DOCUMENTS 0187641 7/1986 European Pat. Off.
2172171 9/1986 United Kingdom.

OTHER PUBLICATIONS

ICC'84, Links for the Future—IEEE International Conference on Communications, Amsterdam, The Netherlands, May 14–17, 1984, vol. 2, pp. 707–710, A. Furukawa, et al., "Motion-Adaptive Interpolation for Videoconference Pictures".

Computer Vision, Graphics and Image Processing, vol. 21, Feb., 1983, pp. 262–279, New York, USA, M. Yachida, "Determining Velocity Maps by Spatio-Temporal Neighborohoods from Image Sequences".

Signal Processing, vol. 11, No. 4, Dec., 1986, Amsterdam, The Netherlands, pp. 387–404, M. Bierling, et al., "Motion Compensating Field Interpolation Using a Hierarchically Structured Displacement Estimator".

ICC'86—IEEE International Conference on Communications, vol. 2, pp. 11280–11284, Jun. 22–25, 1986, Toronto, Canada, Y. Ninomiya, et al., "A Motion Vector Detector for Muse Encoder".

Primary Examiner—Leo H. Boudreau
Assistant Examiner—Steven Klocinski
Attorney, Agent, or Firm—Oblon, Spivak, McClelland, Maier & Neustadt

[57] ABSTRACT

A process, and a corresponding device, for temporal image interpolation with corrected movement compensation, respectively use a consistency analysis step or circuit to analyse the defects in a field of movement which results from the movement estimation process step or device to perform either compensated-movement interpolation, or linear interpolation, depending whether the field of movement is estimated to be corrected or defective for the current point of the frame to be interpolated. Preferentially, to avoid abrupt transition between the two modes of interpolation, a process step or circuit enables intermediate values to be found which take into account the two modes of interpolation in the transition zones.

15 Claims, 7 Drawing Sheets

FIG.6
INITIAL ("eroded") MATRIX
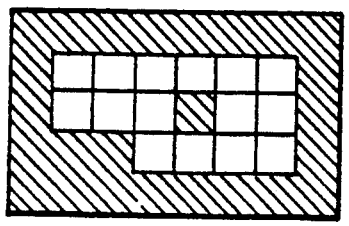
IF LENGTH(white segment) <3 THEN THIS SEGMENT IS FILLED IN
1/ LINE FILLING
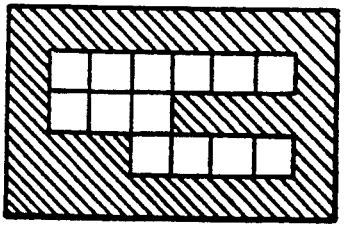
2/ COLUMN FILLING
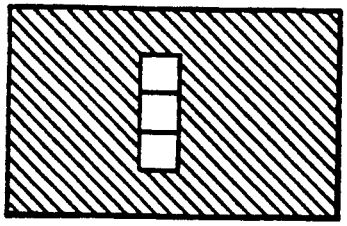
3/ LINE FILLING
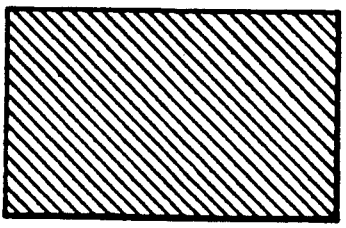

PROCESS AND DEVICE FOR TEMPORAL IMAGE INTERPOLATION, WITH CORRECTED MOVEMENT COMPENSATION

BACKGROUND OF THE INVENTION

1. Field of the Invention

The invention concerns image processing, and more particularly temporal interpolation of images working from parent images, with movement compensation.

Interpolation of an image sequence working from another sequence comprises generating an image of the final sequence from images of the original sequence by spatial and temporal interpolation. The purpose of this interpolation is to determine the characteristics (luminance value and if applicable chrominance value) of each pixel of the image to be generated, from the characteristics (luminance value and if applicable chrominance value) of the corresponding pixels in the original images surrounding it. In the following the terms frame and image will be used interchangeably, and only the cases where the input and output frames are described by the same number of lines and points per line will be considered. The other cases can be processed in the same way with the addition of appropriate spatial filtering which will not be described here.

Numerous applications of image interpolation exist. It is used notably as the standard method of converting television image sequences from a 50 Hz standard to a 60 Hz standard or vice versa. It can also be used in coding, for sequence restitution, when frame selection has been performed in the coder. It also more generally enables the image frequency in a sequence to be increased, for example to improve visual comfort.

2. Description of the Prior Art

For image interpolation, a first technique comprises interpolating using a linear space-time filter, this filter being fixed for all the points in the frame and being a function only of the durations separating the input frames from the frames to be generated. It is known that these methods are suitable for the areas or zones of the image which are fixed in time or moving very little, but have considerable defects, in particular for zones with rapid movement. These defects stem from the difficulty in finding a satisfactory compromise between the limitation of the temporal pass band (which creates haziness) and the elimination of the undesirable spectral components (which creates beats).

To avoid these defects, the interpolating filter must be appropriate for the spectrum of the input signal, and this is what is done by a so-called compensated movement interpolation. This technique comprises interpolating the pixels in the direction of movement vectors which are associated with them. To do so the interpolation stage is preceded by a movement estimation operation, which attributes a movement vector to each pixel to be interpolated, this vector in fact giving the address of the same pixel in the input frames which surround the frame to be interpolated. This technique clearly requires the problem of movement analysis to be satisfactorily solved, and in particular, to obtain good image quality, requires the field of movement to be precisely defined, a movement vector being estimated for each pixel and with a precision of better than a pixel. Suitable movement estimators are known, which are capable of reliably supplying a precise movement vector field. Such a movement estimator is, for example, described in French patent application no. 88 12468, entitled "Process and device for movement estimation in a sequence of moving images".

Two types of movement estimators for image interpolation can be distinguished, depending whether the movement is estimated for the pixels in the frame to be interpolated, or for the pixels in one of the parent frames. If the latter, this estimation must be followed by definition of the field of movement of the frames to be interpolated. A method of interpolation using a technique of this type is described in French patent application no. 87 07814, entitled "Process for temporal image interpolation and device for implementing this process". This method can be used notably when several intermediate frames have to be interpolated from two parent frames: a single movement estimation is made between the two parent frames, then the field of movement of each frame to be interpolated is determined from this estimated field. Later we shall consider the case where the field of movement has been obtained for the frame to be interpolated, whatever the method used to achieve this result.

The interpolation itself thus takes these temporal changes into account. In fact the input and output sequences of the interpolator are two representations of the same continuous and generally dynamic scene, at different series of instants. The contents of the sequence are spatial and temporal in nature and the transfer of information from one sequence to another necessarily takes these temporal changes into account. Thus, for compensated movement image interpolation, the pixel (picture element) is no longer considered as a simple picture element but rather as an object element, able to change in the image during time, appear, move, change luminance, and/or disappear. It is clearly essential to adapt to the movement of the pixels, this movement being a very common cause of change in time; taking it into account means that most of the situations possible in a scene can be processed efficiently. Nevertheless, situations can be easily imagined where the movement analysis is incorrect because the movement as a model of temporal change is not appropriate, for example when objects appear or disappear from one input image to the next.

In fact, to take all possible situations into account, it would be necessary to consider, in addition to the movement of the objects, other causes of temporal variation of luminance in time, such as the intrinsic variation in the luminance of object elements (without consideration of movement), and the possible appearance or disappearance of pixels as object elements. By analogy with what has just been said, the simplest method of interpolation, linear interpolation, assumes that the object elements are fixed and considers that the variation in luminance of the pixels with time is due only to a variation in luminance of the object elements, without movement of these elements.

In a device for compensated movement temporal image interpolation, defects can appear in the interpolation when the movement as a model of temporal change is not appropriate, as for complex dynamic scenes, for example when two slender objects cross, or when the movement of an object makes another object disappear from one image to the next, or when a movement is combined with a variation in luminance.

Exact identification of such changes in time would require sophisticated processing out of proportion to the movement estimation necessary for interpolation, to the frequency of occurrence of this type of situation, and to the sensitivity of the eye to this type of event. However it is impossible to use the information supplied by the movement estimator just as it is, because it is far too noisy and generates extremely inconvenient defects.

SUMMARY OF THE INVENTION

The object of the invention is a process, and the corresponding device, for temporal interpolation with corrected movement compensation which overcome the above-noted deficiencies of the prior art to enable complex dynamic scenes interpolated in a simple and effective way. To this end, the process comprises in determining the defects in the field of movement of the frame to be interpolated, and performing an interpolation in the defect zones thus determined using a replacement method known as a "backup solution".

According to the invention a process of temporal image interpolation, with corrected movement compensation, including a phase of estimating the movement vector field of an image to be interpolated from the parent images surrounding it, the characteristics of the current point being determined from the characteristics of the associated points of the parent images determined by the movement vector assigned to this current point, is characterised by the fact that it also includes a phase of consistency analysis of the movement vector field of the image to be interpolated, and by the fact that the compensated movement interpolation is corrected for the points in the image to be interpolated for which inconsistencies have been detected in the movement vector field.

Another object of the invention is the device intended for the implementation of this process.

BRIEF DESCRIPTION OF THE DRAWINGS

The invention will be better understood and other characteristics will appear from the following description, referring to the appended drawings.

FIG. 6 illustrates the phase of filling the points marked as having defective movement;

DESCRIPTION OF THE PREFERRED EMBODIMENTS

Figure 1:
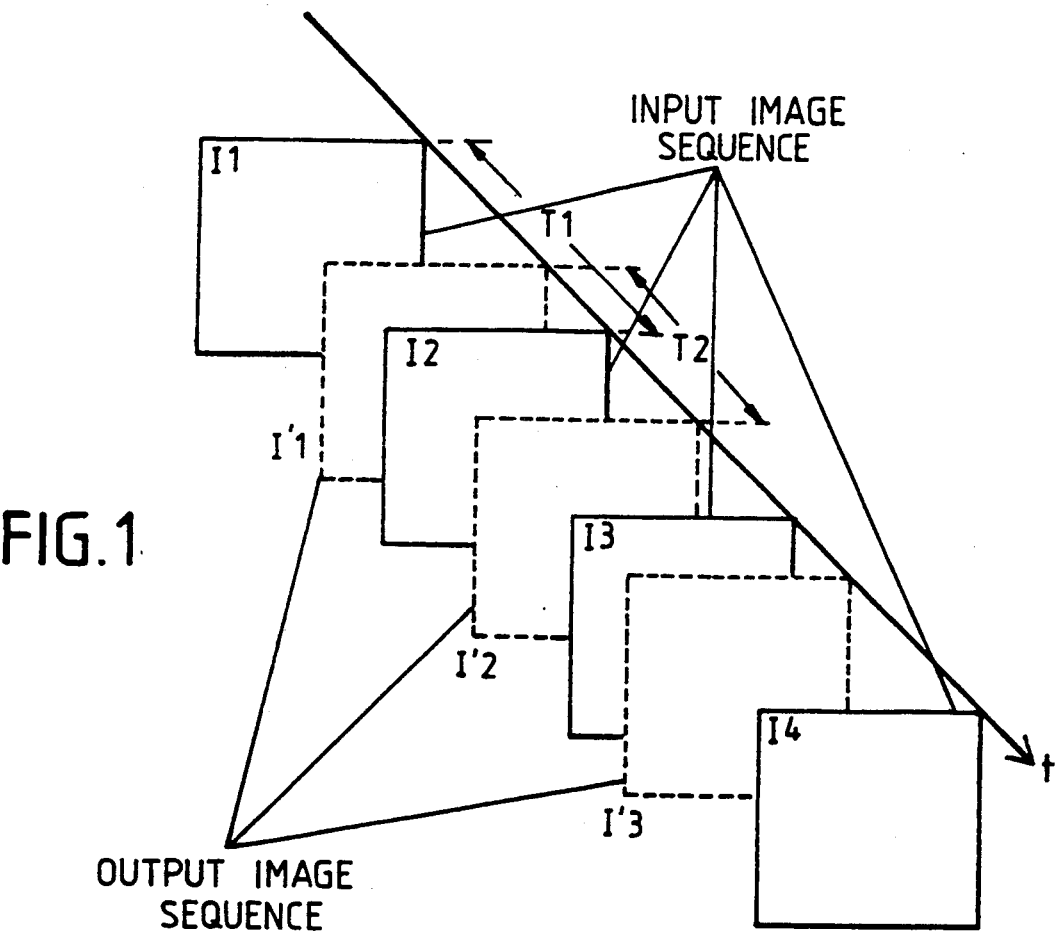
FIG. 1 illustrates the interpolation of a sequence of output images from a sequence of input images.

FIG. 1 illustrates the interpolation, from a sequence of input images I1, I2, I3, I4 at 50 Hz (spaced at T1=20 ms), of a sequence of output images I'1, I'2, I'3, at 60 Hz (spaced at T2=16.6 ms) with a view to standard conversion.

Figure 2:
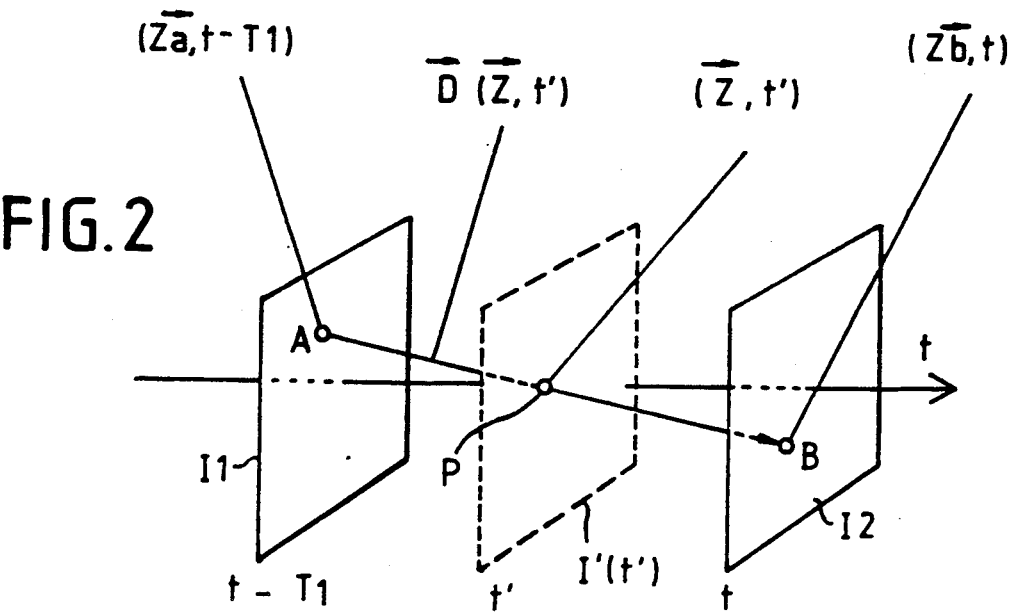
FIG. 2 illustrates the correspondance between two points of two parent images and a corresponding point of the interpolated image.

Generally speaking, an interpolated image can be constituted from more than two input images, but as illustrated in FIG. 2, the processes using compensated movement interpolation enable an intermediate image I' to be obtained from two input images I1 and I2, using the field of movement of the points in the image to be interpolated. Let $\overline{D}(Z,t')$ be the movement vector of the point $P(Z)=P(X,Y)$ of the image to be interpolated, at the instant t' between t-T1 and t, from the processing of images I1 and I2 of the input sequence. The movement vector determines the corresponding points, A in I1 and B in I2 and thus supplies the addresses of the pixel considered as an object element, respectively in the parent images I1 and I2, the movement being assumed to be linear between these two images. The movement vector $\overline{D}$ has two components Dx and Dy in the plane of the image (X, Y).

As indicated above, defects can appear in compensated movement interpolation, notably when the movement as a model of change in time is no longer appropriate.

Figure 3:
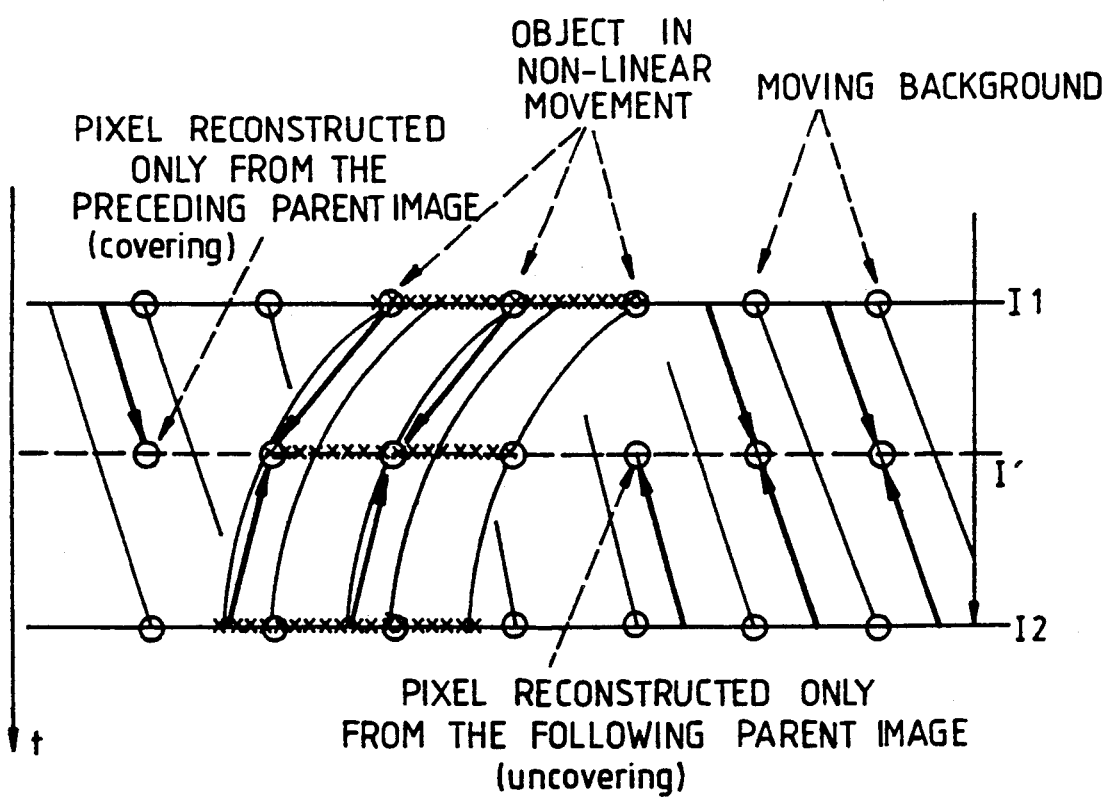
FIG. 3 is a diagram illustrating the appearance and disappearance of pixels in a scene.

FIG. 3 is a diagram illustrating the uncovering (appearance) and covering (disappearance) of object elements from a "parent" image I1 to a "parent" image I2, and the effect of non-linear movement. The small circles represent pixels, and an object present in the image has been represented by crosses. This object is in non-linear movement since its position in the intermediate image is not the result of a translation with its origin and its end in corresponding pixels of the two parent images I1 and I2. On the other hand, the moving background in the two parent images corresponds to a translation. In addition, for the pixels at the edge of the object, one is covered in image I2, and the other is uncovered between I1 and I2. The model given by the field of movement between I1 and I2 is therefore incorrect.

To be able to use a replacement method when necessary, the first stage of the process according to the invention consists in detecting the defects in the movement estimation:

In the movement estimation method described in the application for patent no. 88 12468 mentioned above, an error criterion for movement estimation uses a parameter DFD, called movement-compensated inter-image difference, calculated as follows:

For the current point P(Z,t'), $$DFD(P)=L(B,t)-L(A,t-T1)$$

where L(B,t) is the luminance of the point B in image I2 at time t and L(A,t−T1) is the luminance of the point A in the preceding image I1, at time t−T1.

In theory if points A and B are indeed corresponding points in the parent images I1 and I2, the movement-compensated inter-image difference, i.e. taking the movement into account, DFD, is below a certain threshold. In consequence, for all the points P of the frame to be interpolated, if the temporal movement-compensated inter-image differences in luminance are above a threshold s, the associated movement vector is declared defective and the corresponding point is marked in a consistency matrix. If not, the movement vector is declared correct and the corresponding point of the matrix is not marked.

This stage of detection of defects in the movement estimation can be supplemented by a test on the difference in luminance between points of the same coordinates as the current point of the image to be interpolated in the parent images. This information is characteristic of the degree of similarity of the points of the same coordinates in the parent images and determines whether a simple linear interpolation, not taking the movement into account, is a suitable backup solution for these "defective points".

Another method of analysis, based on the consistency of the field of movement, leads to detection of defective points. In fact, the defects in the field of movement are due either to the imprecision of the estimation algorithm, or to the unsuitability of the movement as a model of temporal change. This generally gives a locally disorganised movement vector field, with clear discontinuities corresponding to a divergence of the estimator. Several local operators can be used to detect defects, using a local histogram or a variance; these require observation of a block of vectors:

a local histogram can be created for a block of points, of dimensions $5 \times 5$ for example, by counting the different movement vectors within the block; the resulting number n is then compared to a threshold $s_1$, and if n is greater than $s_1$, the central point of the block (or the block) is marked as defective;

slightly more elaborate method, based on the histogram of the different vectors of a block of points, consists in calculating the probability $p_i$ of the different movement vectors $D_i$, i.e., for an intermediate image I', then the entropy E which gives information on the "disorder" within the block: $E = -\Sigma p_i.\ln(p_i)$. This entropy is then compared with a threshold $s_2$ and if E is greater than $s_2$, the point (or the block) is marked;

a consistency analysis by variance calculation can also be performed, by calculating the magnitude:

$V = \Sigma |(Dxi - mx)^2 + (Dyi - my)^2|$ where
$mx = (\Sigma Dxi)/N$ and $my = (\Sigma Dyi)/N$, mx and my being the averages of the components of the movement vectors and N the number of points in the block. It is also possible to simplify by calculating a pseudo-variance for which the average is replaced by the components of the movement vector of the central pixel of the bloc, $\overline{Do}$:

$PV = \Sigma(\overline{Di} - \overline{Do})^2$

The variance, or pseudo-variance, is then compared with a threshold $s_3$, and the central point (or the block) is marked defective when V (or PV) is greater than $s_3$.

All the methods of analysing the consistency of the field of movement described above require calculation of the criterion on a block of points. However, as indicated above, the decision may concern the current point, the central point of the block analysed, or concern the whole block of points on which the criterion has been calculated, the blocks are then adjacent, the method thus requiring much less calculation time.

Figure 4:
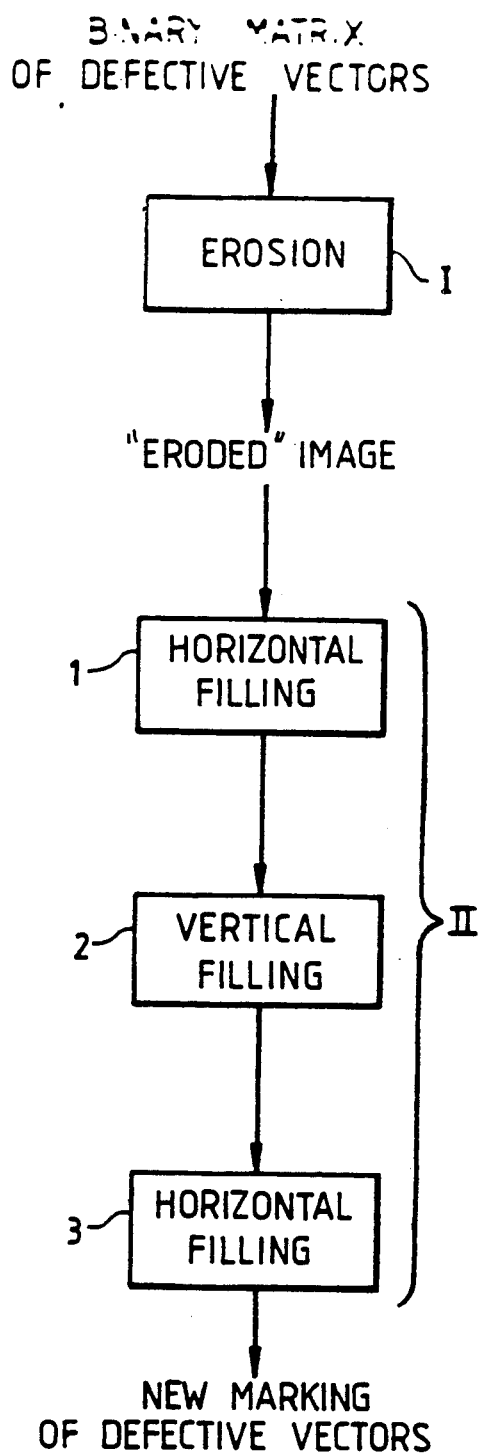
FIG. 4 illustrates the smoothing stage of marking the defective movement vectors.

In all cases, the resulting "defective points" information is extremely noisy and a smoothing stage is then necessary in order to better define the points with defective movement. This smoothing of the information on the inconsistency of the movement field is carried out in two stages described hereafter with reference to FIG. 4.

From the binary matrix characterising the defective vectors obtained by the criterion of consistency of the field of movement, a first phase I of smoothing of the inconsistency information, called erosion, is effected. For each current point marked as defective, if the number of unmarked points in a block centered on this current point is greater than a fixed threshold S, then the point marked as defective in the preceding stage loses its marking in the binary matrix characterising the defective vectors after erosion. The purpose of this stage is to cancel out small zones considered to be insignificant.

The second smoothing phase II is a so-called filling phase and includes a first stage 1 of so-called horizontal filling, a second stage 2 of so-called vertical filling, and a third stage 3 in which another horizontal filling is performed. This smoothing gives new marking of the defective vectors.

Figure 5:
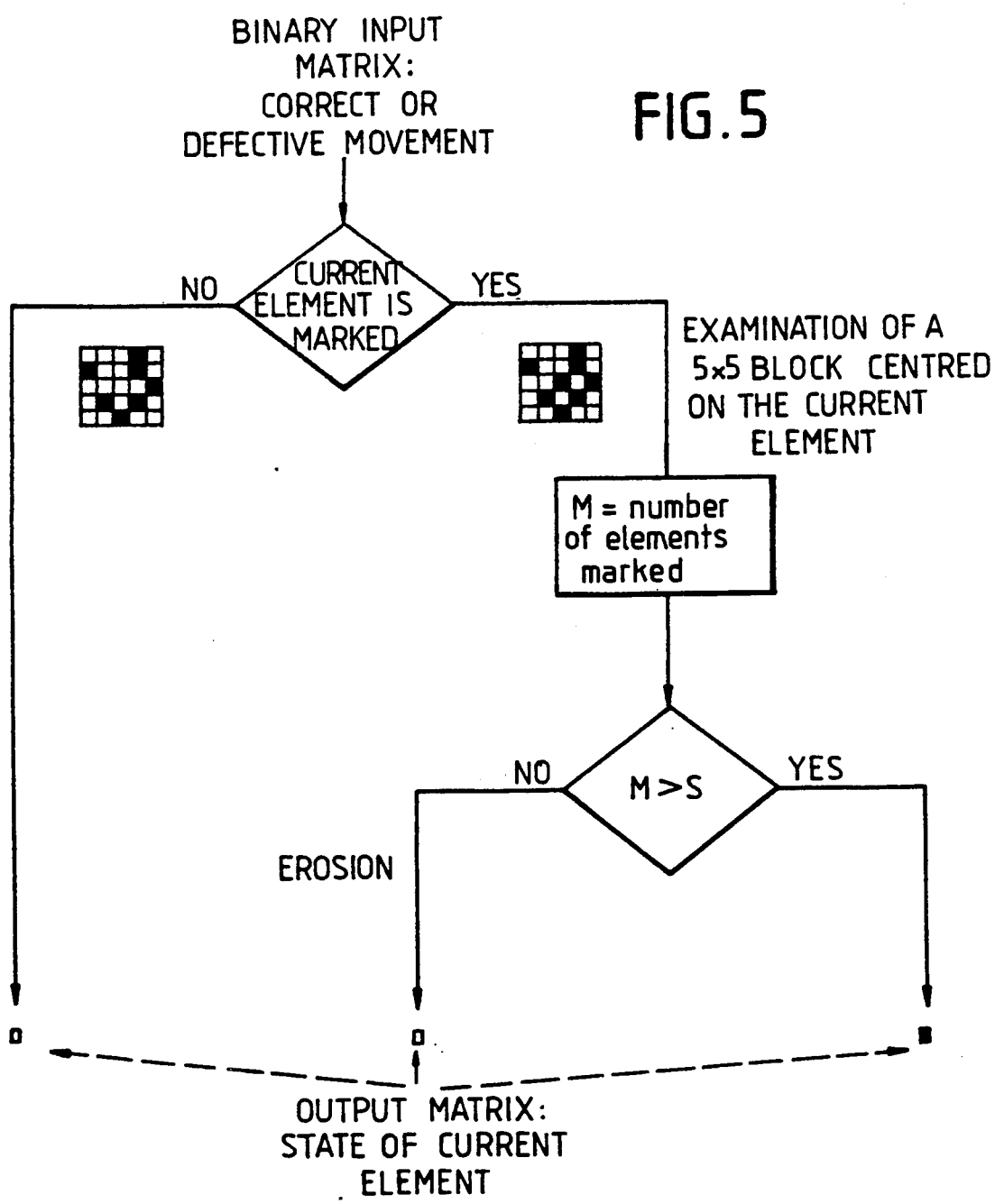
FIG. 5 illustrates the erosion stage of marking the points with incorrect movement.

FIG. 5 illustrates in greater detail the erosion phase of the consistency information smoothing. In this figure, the marking of defective points or blocks is symbolised by filling in the corresponding boxes in a matrix.

If the defective point information is the result of block marking, the adjacent blocks in the image will undergo the same processing, one element of the matrix corresponding to a block of pixels, thus reducing the number of processing stages. The input binary matrix indicating the points or blocks which are correct and those marked as defective is tested by a conventional analysis process, line by line. The first test examines whether the current element of the matrix (point or block) is marked. If it is not, it is transmitted directly to the output of the erosion device. If it is marked, however, the number of marked elements in a $5 \times 5$ block of the matrix centered on the current element being analysed is calculated. This number of marked elements M is then compared with the threshold S. If M is greater than S the element initially marked as defective remains in the same state. If, on the other hand, the number M of marked elements which surround it is less than the threshold S the decision is taken to erode, i.e., the element initially marked is changed to the state characterising a correct element of a movement vector.

FIG. 6 illustrates the effect of the filling phase from an initial eroded matrix as resulting from the preceding phase, i.e. in which the isolated elements have been cancelled out. A predetermined minimum segment length is chosen, e.g. 3 in this example. If the length of a segment of unmarked elements between two marked elements is less than 3, then the whole of the segment is marked. The first phase of line filling, in the example shown, adds two marked elements. The next phase of column filling marks all the unmarked elements belonging to vertical segments of length 1 or 2; there remains only a vertical segment of length 3. The following phase of line filling also removes these points, the result being that the whole of the analysed zone shown in FIG. 6 is considered defective as to the analysis of the movement vector field.

When this phase is finished, if the processing has been performed on blocks of points, the image dimension is readjusted, i.e. the state of the $5 \times 5$ block is assigned to all the corresponding points of the image, and it is this information on the consistency of the movement vector field, after smoothing, which will be used to implement the backup solution when necessary.

As for the backup solution itself, its aim is not faithfully to interpolate the zones found to be defective, in the sense of movement analysis, but to supply information on luminance to mask the interpolation defects as well as possible. In particular, the defects in movement compensation are due, as indicated above, both to the local spatial inhomogeneity of the movement, which deforms the structures in the image, and to the local temporal inhomogeneity which modifies these deformations over time, creating large visible defects. The essential aim of this backup solution is therefore to make the field of movement homogeneous in the zones with defective movements.

Several possible solutions exist. The first suitable solution is a simple linear interpolation. This interpolation can in fact be assimilated to a compensated movement interpolation with a movement vector having null components in the XY plane, but instead of simply using two parent images as in compensated movement interpolation, linear interpolation can be performed working from a greater number of parent images, for example 4 or 6. In the zones with defective movement, the luminance value given by compensated movement interpolation can then be replaced by the luminance value given by linear interpolation.

This linear interpolation is preferably calculated for all points, along with the compensated movement interpolation, so that a "gentle" transition can be effected between the compensated movement method and the linear method, as an abrupt transition is likely to create visible and disturbing discontinuities. In consequence, the transition can be effected as follows: working from the binary consistency matrix of the field of movement, the unmarked pixels are set at zero. The marked pixels are set at a non-zero value V. This two-value matrix of consistency information on the field of movement is then filtered by a low-pass filter and the resulting values a between 0 and V of the pixels of the new (non-binary) matrix enable a mixing coefficient i of the two methods of interpolation to be defined. If the interpolated luminance of a pixel obtained by linear interpolation is IntL and if the luminance of the pixel obtained by compensated movement interpolation is IntCM, the luminance of the pixel of the interpolated image is then equal to:

$$Int = i.IntL + (1-i).IntCM,$$

where i=a/v, a being the value of the pixel in the low-pass filtered consistency information matrix; i is between 0 and 1 as indicated above, this mixture enables the breaks between the compensated movement interpolation and the backup solution to be softened.

Another possible backup solution exists, based on the fact that only one of the components of the movement vector may be incorrect. In consequence, instead of analysing the consistency of the movement vector as a whole, the inconsistency detection is applied to the horizontal and vertical components taken separately. In this solution, defect detection in the movement vector field is applied separately to the horizontal and the vertical components; in the same way the erosion and smoothing stages are applied to the defect matrices thus obtained. The following stage then simply sets to zero the component considered defective, for a given pixel, after the erosion and filling stage.

As in the previous solution, the breaks between compensated movement interpolation and the backup solution must be masked. This is done by filter averaging of the field of movement, by components. The average can be calculated for example in blocks of dimensions 7×7.

Figure 7:
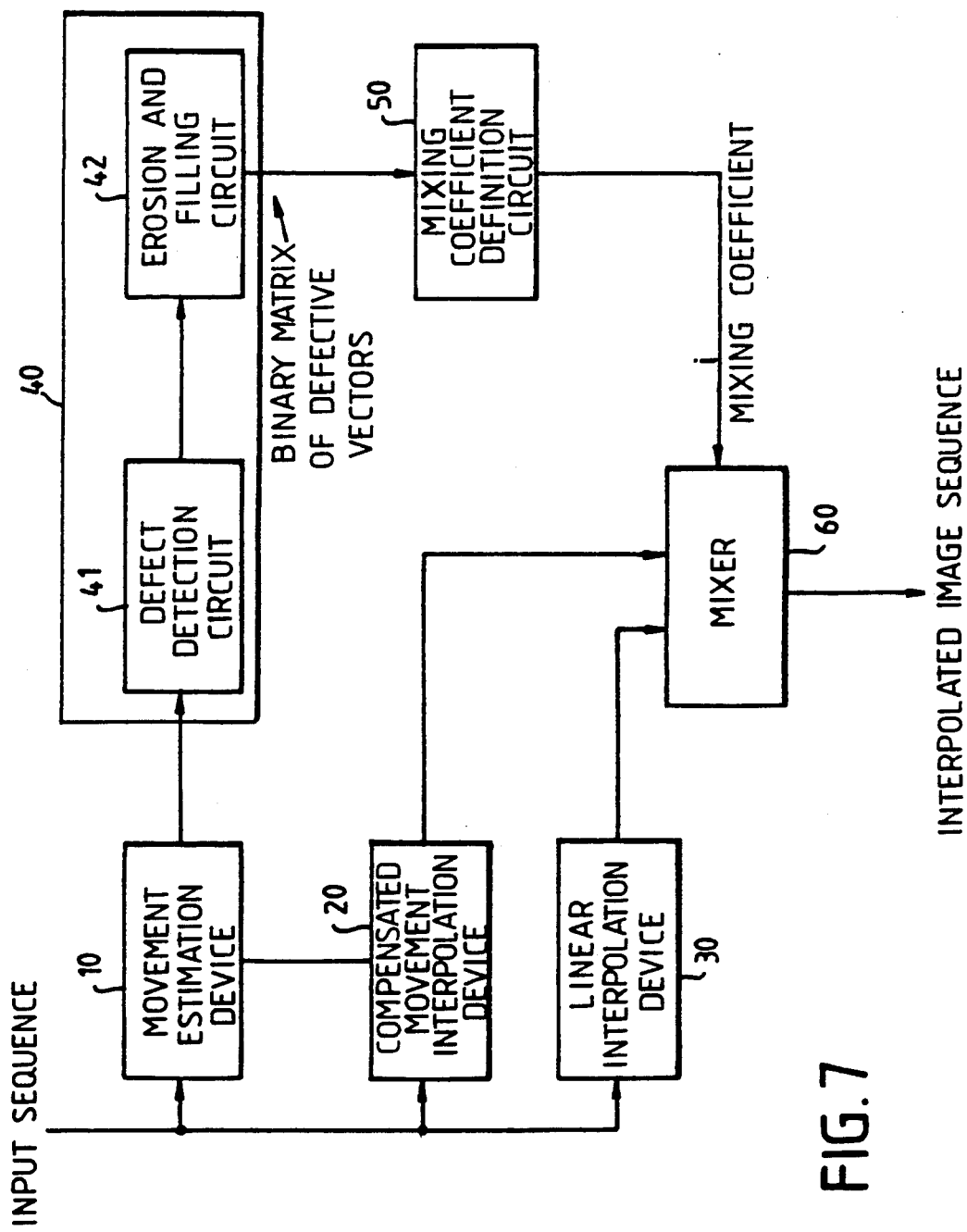
FIG. 7 is a synoptic diagram of the compensated-movement interpolation device according to the invention in a first embodiment.

The synoptic diagram of the compensated movement interpolation device with a backup solution in accordance with the first method is shown in FIG. 7: the input image sequence is applied simultaneously to a movement estimation device 10, a compensated movement interpolation device 20, and a linear interpolation device 30. The compensated movement interpolation device processes the input sequence using information received from the movement estimation device 10. An output from the movement estimation device which gives the movement vector field is connected to a circuit of consistency analysis of the movement vector field 40 which includes a defect detection circuit 41 whose output is connected to a smoothing circuit 42 which carries out the processing described above, erosion and then filling. At the output of this circuit a binary consistency matrix, in which the vectors with defective movement are marked, is thus available. This binary matrix is applied to a circuit 50 for definition of the mixing coefficients i to be applied to a mixer 60 receiving the information from the compensated movement interpolation device 20 and that from the linear interpolation device 30. The mixer 60 delivers the sequence of interpolated images in which the defects due to the imperfection of the model used for compensated movement interpolation are masked.

Figure 8:
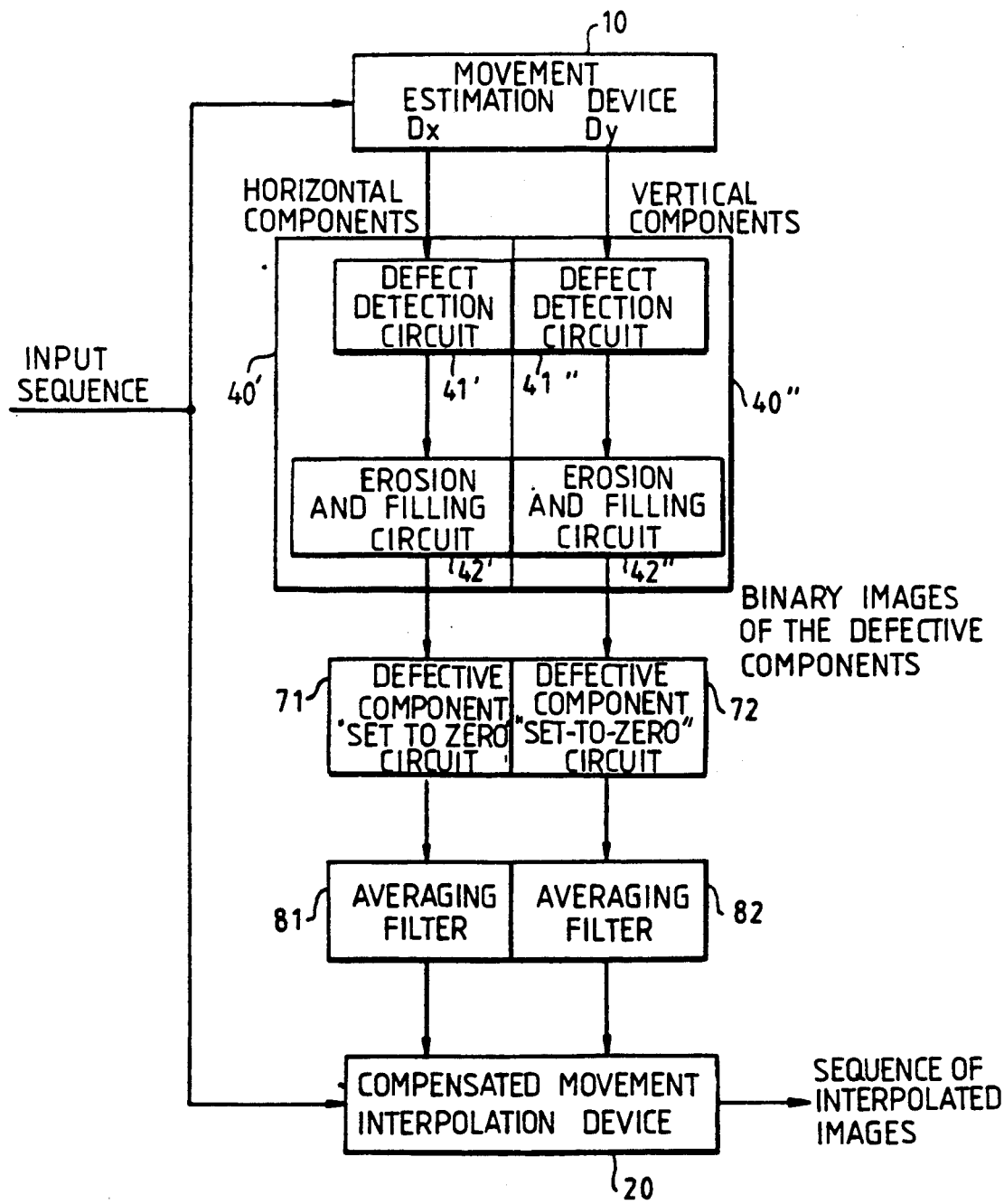
FIG. 8 is the synoptic diagram of the compensated-movement interpolation device according to the invention in a second embodiment.

FIG. 8 is a synoptic diagram of the compensated movement interpolation device with a backup solution according to the second method. In this case the input image sequence is applied as before to a movement estimation device 10, the vertical and horizontal components of the movement vectors being applied respectively to consistency analysis circuits 40' and 40" each including a defect detection circuit, respectively 41' and 41" whose outputs provide the binary matrices characterising "defective" movement vector blocks or points and are connected to smoothing circuits, 42' and 42" respectively, which effect the erosion and filling phases described above for each of the two binary matrices of defective vectors associated with the respectively horizontal and vertical components. The resulting binary matrices, after smoothing, are transmitted to circuits 71 and 72 which set the defective components to zero. The outputs from these circuits are connected to the inputs of averaging filters, 81 and 82 respectively, which provide the components of the movement vector directly processed to avoid abrupt transitions. It is these processed components which are applied to the compensated movement interpolation device 20, which also receives the input image sequence, and which supplies the sequence of interpolated images.

The invention is not restricted to the embodiments precisely described above, notably as regards the modes of interpolation intended to replace the compensated movement interpolation when the movement vector is found to be incorrect.

What is claimed is:

1. Process for temporal image interpolation, with corrected movement compensation, comprising the steps of:
    forming an interpolated image by compensated movement interpolation of parent images using a movement vector field for points of the image to be interpolated, movement characteristics of a current point of the image to be interpolated being determined from movement characteristics of respective corresponding points in the parent images, wherein the movement characteristic of the current point is represent by a movement vector, assigned to the current point, which supplies addresses of the corresponding points in the parent images,
    performing consistency analysis of the movement vector field of the image to be interpolated to detect inconsistencies in the movement vector field for points of the image to be interpolated, and
    correcting the compensated movement interpolation for points of the image to be interpolated for which inconsistencies have been detected in the movement vector field.

2. Process according to claim 1, wherein the step of performing consistency analysis of the movement vector field of the image to be interpolated includes the step of detecting defects in the movement vector field to form a matrix of elements arranged in rows and columns, the elements of the matrix respectively representing the movement vectors for each of the points of the image and characterizing, respectively, one of a correct and defective movement vector for each point.

3. Process according to claim 2, wherein the detection of the defects in the movement vector field is obtained by a comparison, with a threshold, of a difference in luminance between respective point of the parent images corresponding to the current point, the current point being marked as defective in the matrix when this difference is greater than the threshold value.

4. Process according to claim 2, wherein the elements of the matrix are arranged in blocks of elements, and wherein the detection of the defects in the movement vector field is obtained by comparison of a threshold with one of a variance of the elements in each of the blocks of the matrix and a number of different movement vectors in a histogram of the movement vectors of the points represented by the elements in the respective blocks, the movement vectors of the points represented by the elements of the blocks being marked as defective when one of the variance and the number is greater than the threshold value.

5. Process according to claim 2, wherein the detection of the defects in the movement vector field is performed for each point in the image.

6. Process according to claim 4, wherein the detection of the defects in the movement vector field is carried out for each of the blocks, all the elements of each block analyzed being marked as defective when the field of movement of the elements of the block is inconsistent.

7. Process according to claim 2, wherein the step of detecting the defects in the movement vector field is followed by a smoothing step which, during an erosion step thereof, cancels out isolated defective points, and during a filling step thereof, marks as defective the points recognized to be correct during the defect detection step but which are isolated in portions of the image to be interpolated which are marked as defective.

8. Process according to claim 2, wherein, along with the compensated movement interpolation of the current point of the image to be interpolated, a linear interpolation between points of the same coordinates as the current point in the parent images is calculated, movement characteristics of the current point of the image to be interpolated being determined from movement characteristics resulting from these two interpolations as a function of defects detected in the movement vector field.

9. Process according to claim 8, wherein the luminance of the current point of the image to be interpolated is the value obtained by temporal interpolation with movement compensation for the points in the image for which inconsistencies have not been detected for associated movement vectors, and is the value obtained by linear interpolation for the points detected as having inconsistencies for their associated movement vectors.

10. Process according to claim 8, wherein there is a step of smoothing of the elements of the matrix giving intermediate states to the points represented by the elements of the matrix in the neighborhood of transitions between values corresponding to values of movement vectors for which inconsistencies have not been detected and for zones of the matrix corresponding to movement vectors detected as having inconsistencies, and wherein the luminance of the current point of the image to be interpolated, Int, is the result of a combination of the luminance obtained by compensated movement interpolation, IntCM, and the luminance obtained by linear interpolation IntL, such that:

Int = i.IntL + (1−i) IntCM, where i, a mixing coefficient between 0 and 1, is a function of a state of the corresponding point of the elements in the matrix.

11. Process according to claim 1, wherein the consistency analysis of the movement vector field is performed by separate analyses of vertical and horizontal components of the movement vectors, a luminance of the current point of the image to be interpolated being obtained by interpolation with movement compensation corrected by cancelling of the vertical and horizontal components of the movement vector when they have been found to be defective, then spatial filtering of the vertical and horizontal components separately.

12. Device for temporal image interpolation, with corrected movement compensation, comprising:

a movement estimation device for receiving an input image sequence of parent images and for forming a movement vector field for points of each intermediate image to be interpolated between two parent images of the input image sequence, and a compensated movement interpolation device for receiving both the input image sequence and the movement vector field of the images to be interpolated, including in addition:

a linear interpolation device also receiving the input image sequence, a consistency analysis circuit for consistency analysis of the movement vector field whose input is connected to an output of the movement estimation device and whose output is connected to a control input of an output circuit also connected to the interpolation devices, supplying for each point in the intermediate image a luminance value deduced from luminance values interpolated by the compensated movement and linear interpolation devices.

13. Temporal image interpolation device, with corrected movement compensation, including a movement estimation device and a compensated movement interpolation device which both receive an input image sequence of parent images, wherein orthogonal components of movement vectors associated with points of an image to be interpolated, the components being in a plane of the image to be interpolated, are respectively transmitted to two consistency analysis devices whose outputs are respectively connected to circuits which set to zero components determined as being defective by the consistency analysis circuits, output values resulting from these set-to-zero circuits being coupled to inputs of movement vector components from the compensated movement interpolation device.

14. Device according to claim 13, wherein the outputs of the set-to-zero circuits are connected to inputs of the compensated movement interpolation device via averaging filters for processing the orthogonal components separately.

15. Device according to claim 12, wherein the consistency analysis circuit includes a circuit for detection of defects in the movement vector field followed by a smoothing circuit.

* * * * *